(12) United States Patent
Sarra

(10) Patent No.: US 9,807,104 B1
(45) Date of Patent: Oct. 31, 2017

(54) SYSTEMS AND METHODS FOR DETECTING AND BLOCKING MALICIOUS NETWORK ACTIVITY

(71) Applicant: STEALTHbits Technologies, Inc., Hawthorne, NJ (US)

(72) Inventor: Anthony Nicholas Sarra, Herriman, UT (US)

(73) Assignee: STEALTHbits Technologies, Inc., Hawthorne, NJ (US)

( * ) Notice: Subject to any disclaimer, the term of this patent is extended or adjusted under 35 U.S.C. 154(b) by 0 days.

(21) Appl. No.: 15/142,976

(22) Filed: Apr. 29, 2016

(51) Int. Cl.
H04L 29/06 (2006.01)

(52) U.S. Cl.
CPC ........ H04L 63/1416 (2013.01); H04L 63/083 (2013.01); H04L 63/102 (2013.01); H04L 63/1441 (2013.01); H04L 63/20 (2013.01)

(58) Field of Classification Search
CPC ... H04L 63/1416; H04L 63/20; H04L 63/102; H04L 63/1441; H04L 63/083
See application file for complete search history.

(56) References Cited

U.S. PATENT DOCUMENTS

| | | | | |
|---|---|---|---|---|
| 8,689,333 B2 * | 4/2014 | Aziz | ................... | G06F 9/45537 726/24 |
| 9,071,576 B1 * | 6/2015 | Earl | ..................... | H04L 63/0236 |
| 9,386,006 B1 * | 7/2016 | Maldaner | ................ | H04L 63/08 |
| 9,430,646 B1 * | 8/2016 | Mushtaq | ............... | G06F 21/554 |
| 9,536,091 B2 * | 1/2017 | Paithane | ............... | G06F 21/566 |
| 2003/0046587 A1 * | 3/2003 | Bheemarasetti | .... | H04L 63/0272 726/4 |
| 2003/0089675 A1 * | 5/2003 | Koestler | ................. | G06F 21/31 213/201 |
| 2004/0260474 A1 * | 12/2004 | Malin | ................... | H04L 41/069 702/6 |
| 2005/0149543 A1 * | 7/2005 | Cohen | ............... | G06F 17/30297 |
| 2006/0059539 A1 * | 3/2006 | Shashikumar | ........ | H04L 63/083 726/1 |
| 2006/0130140 A1 * | 6/2006 | Andreev | ............. | H04L 63/1458 726/23 |
| 2007/0280114 A1 * | 12/2007 | Chao | ................... | H04L 43/0888 370/235.1 |
| 2007/0282951 A1 * | 12/2007 | Selimis | .................. | H04L 67/06 709/205 |
| 2013/0254857 A1 * | 9/2013 | Bajenov | .................. | G06F 21/00 726/7 |

(Continued)

Primary Examiner — Michael Pyzocha
(74) Attorney, Agent, or Firm — Austin Rapp

(57) ABSTRACT

An authenticating device configured for network authentication is described. The authenticating device includes a processor. The authenticating device also includes memory in electronic communication with the processor. The authenticating device further includes instructions stored in the memory. The instructions are executable to intercept an authentication request sent to an authentication application program interface (API). The instructions are also executable to send the authentication request to a central server to identify malicious activity patterns based on authentication activity of a plurality of authenticating devices in a network environment. The instructions are further executable to determine whether to block an invocation of the authentication API based on blocking rules received from the central server.

22 Claims, 13 Drawing Sheets

(56) References Cited

U.S. PATENT DOCUMENTS

| | | | |
|---|---|---|---|
| 2015/0163216 A1* | 6/2015 | Xu | H04L 63/08 726/6 |
| 2015/0213449 A1* | 7/2015 | Morrison | G06Q 20/4016 705/44 |
| 2015/0350249 A1* | 12/2015 | Reno | H04L 63/1441 726/1 |
| 2015/0381611 A1* | 12/2015 | Mestanov | H04L 63/0853 726/6 |
| 2016/0057107 A1* | 2/2016 | Call | H04L 63/02 726/11 |
| 2016/0112397 A1* | 4/2016 | Mankovskii | H04L 63/105 726/6 |
| 2016/0308900 A1* | 10/2016 | Sadika | G06F 21/552 |
| 2017/0063793 A1* | 3/2017 | Galbreath | H04L 63/0263 |
| 2017/0149780 A1* | 5/2017 | Tellvik | H04L 63/0884 |

* cited by examiner

SYSTEMS AND METHODS FOR DETECTING AND BLOCKING MALICIOUS NETWORK ACTIVITY

TECHNICAL FIELD

The present disclosure relates generally to computers and computer-related technology. More specifically, the present disclosure relates to systems and methods for detecting and blocking malicious network activity.

BACKGROUND

The use of electronic devices has become an everyday use in modern society. The use of electronic devices has increased as the cost of electronic devices has declined. The capabilities of electronic devices have also increased and allow people to use electronic devices in many different industries and for many different purposes. For example, electronic devices may be used to perform tasks at home, work or school. One type of an electronic device is a computer.

The technology being used in computers has been improving rapidly. Computers may range from small hand-held computing devices to desktop computer systems to large multi-processor computer systems. In some configurations, multiple computers may communicate in a network environment. Network authentication may be performed to secure network resources. For example, a calling device may provide login credentials to an authenticating device in order to access network resources.

In some instances, an attacker may attempt to perform malicious activity in a network environment. For example, an attacker may seek to compromise the authentication procedures of a network environment to access network resources. Benefits may be realized by detecting and blocking malicious activity through network authentication.

DETAILED DESCRIPTION

Figure 1:
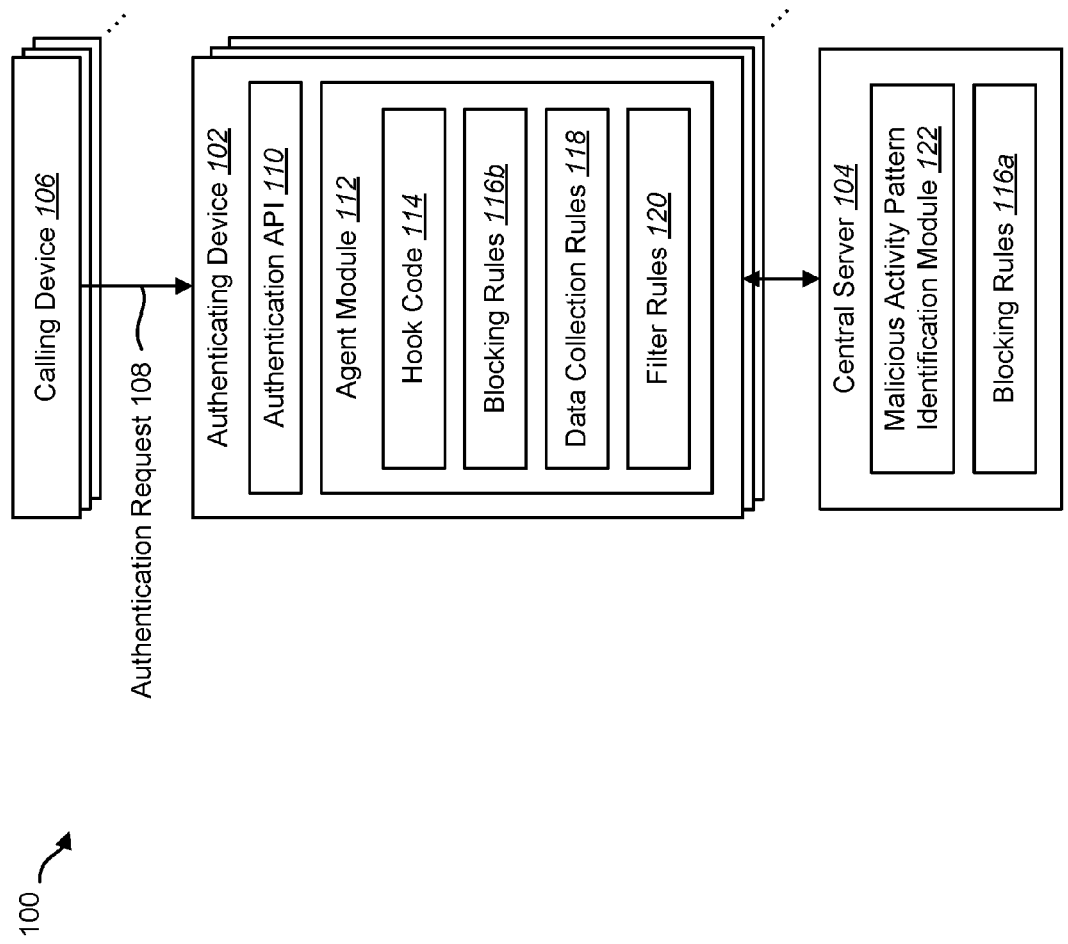
FIG. 1 is a block diagram illustrating one configuration of a network environment in which systems and methods for detecting and blocking malicious network activity may be implemented.

An authenticating device configured for network authentication is described. The authenticating device includes a processor. The authenticating device also includes memory in electronic communication with the processor. The authenticating device further includes instructions stored in the memory. The instructions are executable to intercept an authentication request sent to an authentication application program interface (API). The instructions are also executable to send the authentication request to a central server to identify malicious activity patterns based on authentication activity of a plurality of authenticating devices in a network environment. The instructions are further executable to determine whether to block an invocation of the authentication API based on blocking rules received from the central server.

When the blocking rules instruct the authenticating device to block the authentication request, the instructions may be further executable to block the authentication request from calling the authentication API. An access denied message may be sent to a calling device.

When the blocking rules instruct the authenticating device to permit the authentication request, the instructions may be further executable to allow the authentication request to call the authentication API.

The authenticating device may be a domain controller configured with the authentication API and an agent module. The agent module may include a hook code that intercepts the authentication request, sends the authentication request to the central server for centralized blocking rule creation and determines whether to block a current authentication request from invoking the authentication API based on blocking rules previously received from the central server. If an authentication request is blocked then a message may be sent to the central server for centralized reporting or alerting IT personnel about blocked operations.

The instructions may be further executable to collect authentication request data based on data collection rules received from the central server. The authentication request data that is sent to the central server may be filtered based on filter rules received from the central server. The authentication request data may be applied to the blocking rules to determine whether to block invocation of the authentication API.

The authentication API may be a Kerberos protocol API or NT LAN Manager (NTLM) protocol API in a Microsoft Windows environment.

The instructions may be further executable to determine that a Kerberos ticket contains a maximum lifetime for user ticket or a maximum lifetime for user ticket renewal with a value above a value specified by the blocking rules.

The blocking rules may instruct the authenticating device to block the authentication request based on a security principle initiating the authentication request, a calling device initiating the authentication request or a resource that the authentication request is seeking to access.

When the blocking rules instruct the authenticating device to block the authentication request, the instructions may be further executable to cause a lower level API to return a reserved value to an upper level API. The reserved value causes the upper level API to return an access denied signal to the authentication request. The reserved value is not used in native operation of the authentication API.

A method for network authentication by an authenticating device is also described. The method includes intercepting an authentication request sent to an authentication API. The method also includes sending the authentication request to a central server to identify malicious activity patterns based on authentication activity of one or more authenticating devices in a network environment. The method further includes determining whether to block an invocation of the authentication API based on blocking rules received from the central server.

A central server is also described. The central server includes a processor. The central server also includes memory in electronic communication with the processor. The central server further includes instructions stored in the memory. The instructions are executable to identify malicious activity patterns based on authentication activity of a plurality of authenticating devices in a network environment. The instructions are also executable to determine blocking rules based on identified malicious activity patterns. The blocking rules instruct an authenticating device to block an authentication request from invoking an authentication API. The instructions are further executable to send the blocking rules to one or more authenticating devices in the network environment.

Identifying malicious activity patterns may include determining that a specified count of repeated failed authentications reported by one or more authenticating devices in a specified time period exceeds a certain threshold.

Identifying malicious activity patterns may include determining that a specified count of repeated failed logins against a given authenticating device in a specified time period exceeds a certain threshold.

Identifying malicious activity patterns may include determining that a specified count of user account authentications across multiple network assets in a specified time period exceeds a certain threshold.

Identifying malicious activity patterns may include identifying attempted use of a nonexistent user name on one or more authenticating devices in the network environment.

Identifying malicious activity patterns may include determining that at least a specified count of failed authentications for a given security principle due to a bad password followed by a successful authentication in specified time has occurred.

Identifying malicious activity patterns may include determining that a same security principle is authenticated from more than specified network locations in specified time frame.

Identifying malicious activity patterns may include determining that multiple authenticated accounts originate from a single system.

The blocking rules may instruct an authenticating device to block an authentication request based on a security principle initiating the authentication request, a calling device initiating the authentication request or a resource that the authentication request is seeking to access.

The instructions may be further executable to send data collection rules to one or more authenticating devices indicating authentication request data to be collected. Filter rules may be sent to one or more authenticating devices indicating how to filter the authentication request data that is sent to the central server.

A method by a central server is also described. The method includes identifying malicious activity patterns based on authentication activity of a plurality of authenticating devices in a network environment. The method also includes determining blocking rules based on identified malicious activity patterns. The blocking rules instruct an authenticating device to block an authentication request from invoking an authentication API. The method further includes sending the blocking rules to one or more authenticating devices in the network environment.

FIG. 1 is a block diagram illustrating one configuration of a network environment 100 in which systems and methods for detecting and blocking malicious network activity may be implemented. In particular, the systems and methods disclosed herein may allow for detecting and blocking malicious activity through network authentication processes.

A network environment 100 may include one or more authenticating devices 102 that are configured to perform network authentication. An authenticating device 102 may be a computing device (e.g., server) that is configured to communicate with other computing devices in the network environment 100.

In an implementation, an authenticating device 102 may be a domain controller (DC) that is configured with an authentication API 110. In the case of a Microsoft Windows environment, the authentication API 110 may be for a Kerberos protocol API or an NT LAN Manager (NTLM) protocol API.

One or more calling devices 106 may seek to access network resources. For example, the calling device 106 may be a computing device (e.g., desktop computer, laptop computer, tablet computer, smartphone, server, etc.) that is configured to communicate in the network environment 100. The calling device 106 may be located within a local network of an authenticating device 102 (e.g., local area network (LAN), wireless local area network (WLAN)) or the calling device 106 may attempt to access the network via a remote connection (e.g., remote desktop connection, Internet connection).

The calling device 106 may send one or more authentication requests 108 to an authenticating device 102 to seek access to network resources. For example, when a user seeks to access the network environment 100, the user may enter user credentials into the calling device 106. In one scenario, the user credentials may be entered by a human. In another scenario, the user credentials may be entered by an automated service account. As used herein, the term "security principle" includes either a user or a service account associated with an authentication request 108. Therefore, a particular security principle may initiate one or more authentication requests 108.

In an implementation, the user credentials may include a user ID (also referred to as a user name) and a password. The calling device 106 may include the user credentials in the authentication request 108. The authentication request 108 may include additional data. For example, the authentication request 108 may include a date and/or timestamp. The authentication request 108 may also include information about the calling device 106 that originated the authentication request 108.

Upon receiving the authentication request 108, the authenticating device 102 may call upon an authentication API 110 to perform network authentication based on the user credentials. The authentication API 110 may evaluate the user credentials to determine whether they are valid. If the user credentials are valid, the authentication API 110 may authorize the calling device to access the network environment 100. For example, the authenticating device 102 may issue the calling device 106 an access token, which the calling device 106 uses during a session to authenticate to other network resources.

In the case of a Kerberos protocol, the authentication API 110 may issue a Kerberos ticket to the calling device 106 with which the calling device 106 may gain access to network resources. In Kerberos, when a calling device 106 is authenticated to the domain controller, the calling device 106 receives a ticket from Kerberos that is good for a particular amount of time. For example, the Kerberos ticket may be valid for 8 hours and renewable for 24 days. Once the calling device 106 has a Kerberos ticket, the calling device 106 may present the Kerberos ticket to another network resource, which looks at the timestamp to see if the ticket has expired.

Within a given domain, there may be multiple authenticating devices 102 (e.g., domain controllers) that share the workload. Multiple authenticating devices 102 provide fail-safe redundancy. However, there is one and only one authenticating device 102 that responds to a given authentication request 108. Whichever authenticating device 102 is physically closest to the calling device 106 may be the first to respond to the authentication request 108. But if that authenticating device 102 cannot handle the authentication request 108 (e.g., is busy), then the authentication request 108 will be handled by a different authenticating device 102.

Network authentication is vulnerable to a number of different types of malicious activity that may compromise network security. The malicious activity may include attacks from third-party actors (e.g., hackers) or trusted inside actors that exploit valid user credentials to access network resources in an inappropriate manner.

In one approach, antivirus software may detect some suspicious activity. However, antivirus software can only monitor activity on one computing device (e.g., authenticating device 102) in a networking environment 100. Because antivirus software only has visibility to activity on a single computing device, this computing device is viewed in isolation. Therefore, the antivirus software does not have the ability to influence behavior on computing devices other than the one that a particular instance of the antivirus software is installed on. In other words, antivirus software cannot provide real-time blocking of malicious activity on other computing devices in a network environment 100.

In another approach, log gatherers collect event and other logs from individual computing devices and send this information to a central location for analysis. However, a log gathering approach has several disadvantages. This approach is not real-time due to delays in gathering and sending the logs, which are typically very large. Also, logs typically have vast amounts of less or irrelevant data in addition to authentication data, which leads to scalability issues and further time delays. These problems may be somewhat mitigated by devoting more hardware to the solution, but this too is a disadvantage at least in terms of costs. Furthermore, there is no possibility to block real-time activity using log gatherers. This approach only provides after-the-fact monitoring.

In yet another approach to monitoring malicious network activity, port mirroring may be used to watch for authentication activity at the network level (e.g., TCP/IP level). While this can provide a real-time solution to alert about suspicious activity, port mirroring also has several disadvantages. Port mirroring requires a high cost and complexity for acquiring and managing switches with port mirroring hardware capability. Also, port mirroring is blind to authentications handled by any authenticating device 102 (e.g., domain controller) not connected to a mirrored port or if port mirroring is disabled. Additionally, there is no possibility to block real-time activity with port mirroring. Once again, this is only after-the-fact monitoring.

The systems and methods described herein provide for detecting and blocking malicious activity through network authentication processes. Through the process of watching user- and/or machine-initiated authentication activity at an enterprise level, patterns of activity may be observed. These patterns of authentication activity may be analyzed and the results used to identify malicious activity patterns.

The network environment may include a plurality of authenticating devices 102. As stated above, an authenticating device 102 may be a domain controller that includes an authentication API 110.

An authenticating device 102 may include an agent module 112. The agent module 112 may be a program that is installed on the authenticating device 102 that communicates with a central server 104. The agent module 112 may have a two-way communication channel with the central server 104. In other words, the agent module 112 may send and receive information from the central server 104 in a persistent or semi-persistent manner.

The central server 104 may communicate with a plurality of agent modules 112. The central server 104 may send information to or receive information from each agent module 112 installed on the multiple authenticating devices 102 in the network environment 100. For example, the central server 104 may have the ability to talk over TCP between the authenticating devices 102. The central server 104 could provide one back end for receiving authentication information from multiple domains. The central server 104 may or may not be on the same domain as an authenticating device 102.

An agent module 112 may include hook code 114. The hook code 114 may enable the agent module to hook (i.e., intercept) the authentication API 110. As used herein, the term hook or hooking refers to altering the behavior of the native operating system of the authenticating device 102 by intercepting a function call. In this case, the agent module 112 may use the hook code 114 to intercept the native authentication API 110 invocation by the authentication request 108.

In a Microsoft Windows environment, the relevant authentication API 110 may be for Kerberos or NTLM. However, the authentication API 110 may be associated with other authentication protocols used for other operating systems (e.g., Unix, Linux, MacOS).

Various functions may be hooked to capture and block NTLM or Kerberos authentication requests 108. For NTLM, NlpLogonSamLogon from netlogon.dll may be hooked by the agent module 112. The function 'NlpLogonSamLogon' is responsible for handling NTLM authentication requests.

For Kerberos, one or more of the following functions from the kdcsvc.dll may be hooked by the agent module 112: KdcGetTicket, I_GetASTicket, HandleTGSRequest, and KdcVerifyKdcRequest. 'KdcGetTicket' is the function for querying Kerberos tickets, which internally splits into: I_GetASTicket and HandleTGSRequest. I_GetASTicket handles queries to the 'Authentication Service,' which returns 'ticket-granting-ticket'-s. HandleTGSRequest handles queries to 'Ticket-Granting-Service', which returns a 'service ticket' allowing authentication against an actual resource. 'KdcVerifyKdcRequest' is the function which is called by 'HandleTGSRequest' to verify internals of a 'TGS Request'. This is a place where data may be extracted from input parameters because the function accepts decrypted data.

An additional hook may be used to capture SECURITY_LOGON_TYPE for both NTLM and Kerberos by hooking the NegLogonUserEx2 function in lsasrv.dll.

When the authenticating device 102 receives an authentication request 108 intended for the authentication API 110, the agent module 112 may intercept the authentication request 108. The agent module 112 may prevent (at least momentarily) the authentication request 108 from calling (i.e., invoking) the authentication request 108. The agent module 112 may then send the authentication request 108 to the central server 104. These authentication events may be sent in real time to the central server 104 for analysis so that patterns of activity that often span multiple servers (e.g., authenticating devices 102) can be identified.

In an implementation, the agent module 112 may collect authentication request data based on data collection rules 118 received from the central server 104. The data collection rules 118 may instruct the agent module 112 as to what data to scrape from the hook (i.e., the intercepted authentication request 108). For example, the authentication request data may include the user ID, the timestamp of the authentication request 108, the calling device ID and the authenticating device ID. Additionally, the authentication request data may include the target network resource and type of access being requested. Examples include (a) accessing files on network share, (b) mapping a drive to a network share, (c) initiating an RDP session to another computer and (d) accessing the registry of another computer.

The agent module 112 may filter the authentication request data that is sent to the central server based on filter rules 120 received from the central server 104. The filter rules 120 may indicate authentication request data that the agent module 112 need not report to the central server 104. Therefore, the agent module 112 may not send authentication request data to the central server 104 that is always considered safe. In this way, the traffic going across the network may be minimized.

In an implementation, the agent module 112 may consolidate similar operations over a short time interval before reporting the authentication event to the central server 104. In one example, this time interval may be one minute, though any time interval may be used. Thus, high volume but otherwise identical authentication events may be more efficiently communicated to the central server 104 for analysis. This implementation may improve scalability and minimize network traffic.

An example of this implementation is a service account configured with a bad (e.g., expired) password that generates hundreds of failed logins per second. In such a case, only the timestamp differs from one event to the next as information like the source machine, security principle and resource attempting to authenticate (i.e., the authenticating device 102) all remain the same. Thus, a single authentication event report with the aforementioned data plus a count of recurrences in the time interval has all relevant data in a more concise form.

The agent module 112 may also report the results of an authentication event to the central server 104. For example, the agent module 112 may notify the central server 104 whether a given authentication request 108 was successful or unsuccessful upon invoking the authentication API 110. The agent module 112 may include authentication result data associated with these authentication events in the report sent to the central server 104. This authentication result data may be generated based on the data collection rules 118 and filter rules provided by the central server 104.

The central server 104 may identify malicious activity patterns based on authentication activity of a plurality of authenticating devices 102 in the network environment 100. In other words, from a security standpoint, the central server 104 may detect abnormal activity by analyzing the authentication activity of users or malicious software. The central server 104 may include a malicious activity pattern identification module 122 that monitors authentications (e.g., when a calling device 106 is accessing resources in the network). The malicious activity pattern identification module 122 may receive the authentication request data from one or more authenticating devices 102. A calling device 106 could be seeking to access network resources such as file shares or establishing desktop connections.

If the central server 104 detects a change in pattern or behavior, this may indicate malicious activity. For example, the central server 104 may determine that authentication activity reaches a certain threshold. A high frequency of certain behaviors or activities may be an indicator of malicious activity.

In an example, most security principles (e.g., people) do not connect remotely to more than a couple of computing devices during a given day as part of normal work. If the central server 104 observes somebody connecting to 50 different machines in a short period of time, this may indicate malicious activity where someone may be looking at or collecting data from multiple computers in a short period of time.

Also, the central server 104 may analyze failed authentications. Normally, if somebody forgets their password, they might go through 3 or 4 failed login attempts. If the central server 104 starts seeing hundreds (for example) of failed login attempts, the may indicate either a misconfigured service or an expired password. While this may not necessarily be a security attack, this activity does overload network resources with the cost of failures. The failed authentications could also be an indication of an attack where a person or a program is trying to guess a password to gain access. It should be noted that while Windows DCs have the default ability to lock an account due to too many failed passwords in given time frame, this feature is sometimes turned off in corporate environments in an effort to reduce user calls to the IT help desk to unlock accounts.

Several types of malicious activity may be detected by the central server 104 through analysis of authentication activity. Examples of malicious activity that are detected by the central server 104 include brute force attacks (described in connection with FIG. 5), user account hacking (described in connection with FIG. 6), horizontal movement attacks (described in connection with FIG. 7), a bad user ID (described in connection with FIG. 8), a breached password (described in connection with FIG. 9), concurrent logins (described in connection with FIG. 10), impersonation logins (described in connection with FIG. 11) and golden ticket attacks (described in connection with FIG. 12).

These are just some examples of the malicious activity patterns that the central server 104 could identify from just watching authentication activity. In addition to these listed examples, other malicious activity may be identified by analyzing authentication activity.

It should be noted that just looking at the authentication activity of a single authenticating device 102 in isolation does not provide complete context for the network environment 100. However, by analyzing authentication activity across multiple authenticating devices 102 in real time, the central server 104 can correlate that activity and identify malicious activity.

Upon identifying malicious activity patterns, the central server 104 may determine blocking rules 116a based on identified malicious activity patterns. The blocking rules 116a may instruct an authenticating device 102 to block an authentication request 108 from invoking the authentication API 110. The blocking rules 116a may instruct the agent module 112 to block authentication requests 108 based on various criteria. This may include a security principle (user or service account) initiating the authentication request 108, the calling device 106 initiating the authentication request 108, or a resource (e.g., file share, remote desktop protocol (RDP) session, etc.) that the authentication request 108 is seeking to access. The blocking rules 116a may also instruct the agent module 112 to block authentication requests 108 based on date or time factors. The blocking rules 116a may also instruct the agent module 112 to block authentication requests 108 based on other factors not listed.

The central server 104 may send the blocking rules 116a to one or more authenticating devices 102 in the network environment 100. For example, the central server 104 may send the blocking rules 116a to each agent module 112 in the network environment 100.

Upon intercepting an authentication request 108, the authenticating device 102 may determine whether to block an invocation of the authentication API 110 based on the blocking rules 116b received from the central server 104. Such a blocking action could be implemented by the hook code 114 evaluating the input parameters to the hooked authentication API 110 relative to the blocking rules 116b received from the central server 104. Because this solution is implemented as hooks in the native authentication API 110 of the authenticating device 102 operating system, the agent module 112 can decide to block an invocation of the authentication API 110 based on its own logic. This logic may be based on the analytics done by the central server 104 as described above.

The agent module 112 may apply the collected authentication request data to the blocking rules 116b to determine whether to block an invocation of the authentication API 110. For example, if the agent module 112 determines that the security principle initiating the authentication request 108 is included in the blocking rules 116b, then the agent module 112 may block the authentication request 108 from invoking the authentication API 110.

If the agent module 112 determines to block the authentication request 108, then instead of calling the original hooked authentication API 110 (e.g., allow the authentication request 108 pass through), the agent module 112 may generate an access denied message or error that is sent to the calling device 106. In this way, the agent module 112 may block the authentication request 108 in a way that does not break the operating system or the calling application of the calling device 106.

In an implementation, the hook code 114 may return an 'access denied' to the caller (e.g., function) of the hooked authentication API 110, which is part of local operating system (e.g., Windows OS). The operating system then propagates this access denied error back up through the call stack, which ultimately may include a remote procedure call (RPC) from the calling device 106. This would eventually lead to an access denied message passed back via the operating system to the calling device 106.

If the blocking rules 116b do not instruct the authenticating device 102 to block the authentication request 108, then the agent module 112 may allow the authentication request 108 to call the authentication API 110. The authentication request 108 may then be authenticated according to the native authentication process of the authenticating device 102. As mentioned above, the agent module 112 may report the result of this authentication to the central server 104.

It should be noted that based on the intercepted function names described above, the blocking approach is different for NTLM and Kerberos. For NTLM, the 'logon' itself is intercepted while for Kerberos, tickets allocation is intercepted. As a result, blocking differs for NTLM and Kerberos cases. For NTLM, a pre-defined error code may be returned instead of making the call to the original 'NlpLogonSamLogon'.

For Kerberos, blocking cannot be performed on the level of 'KdcGetTicket' because the hook code 114 knows nothing about the request internals. In this case, there is no choice other than to call the original function. This leads to one of two cases depending on the authentication request 108 type.

In the case of 'KdcGetTicket' and 'I_GetASTicket', if the authentication request 108 is an 'AS' (e.g., I_GetASTicket), then the agent module 112 may return a pre-defined error code instead of calling the original 'I_GetASTicket'. This leads to the original 'KdcGetTicket' failing with the same error code as specified inside 'I_GetASTicket'. As such, no additional changes need be made inside the KdcGetTicket.

In the case of 'KdcGetTicket', 'HandleTGSRequest' and 'KdcVerifyKdcRequest', if the authentication request 108 is 'TGS', then the agent module 112 may return a reserved value not used by the native Windows implementation inside 'KdcVerifyKdcRequest'. This value may be the function return if the authentication request 108 is invalid. This error code is then propagated to 'HandleTGSRequest' and finally to 'KdcGetTicket', where it is substituted with a pre-defined (i.e., "access denied") error code.

In this case, there is communication between layers of hooked code. The agent module 112 may hook a lower level API that is eventually called due to calls made to other APIs by an upper level API that is also hooked. The agent module 112 may pass a message to itself to indicate it blocked a lower level API. To do this, the agent module 112 may cause the lower level API to return a value not used by Windows (e.g., the value '41') as a signal to the upper level API hook to return an error (e.g., access denied) from the hooked upper level API (because of the decision made in the lower level API hook).

By allowing the authentication request 108 to pass through to the authentication API 110 unless explicitly blocked by the blocking rules 116b, the agent module 112 reduces round-trip latency that may occur if the agent module 112 were to wait for a response from the central server 104 for every authentication event. This may introduce too much of a time delay, which could adversely impact a system. Instead, the agent module 112 may allow non-blocked authentication requests 108 to pass through to the authentication API 110 in real time, feed the authentication request data to the central server 104. Then, if the authentication request data triggers the threshold, the central server 104 would tell the agent modules 112 via a blocking rule 116 to not to allow future authentication attempts. In this approach, the blocking rules 116 are stored locally at the authenticating device 102 and can be analyzed very quickly when the next authentication request 108 comes in. This avoids the problem of round-trip latency.

There are problems that may occur if the agent module 112 waits for a response from the central server 104 before processing the authentication request 108. These problems include the time delays to get a response back, or if the central server 104 is offline. These delays could violate operating system protocols. When hooking functions, in this case, the agent module 112 should be very quick and either call the original authentication API 110 that was hooked, or send an error message. If the agent module 112 is not quick about processing the authentication request 108, this could destabilize the system.

The forgoing solution has the unique ability to take real-time action (e.g., blocking) in response to the detection of malicious activity where such activity may be discernable only from monitoring activity involving multiple authenticating devices 102 in a network environment 100. Therefore, unlike antivirus software on a single computing device, the systems and methods described herein provide network protection by viewing the enterprise as the entity to protect.

It should be noted that while functions are described in terms of particular modules herein, additional or alternative modules and/or a combination of modules or a sub-part of a module may perform one or more of the functions described herein.

Figure 2:
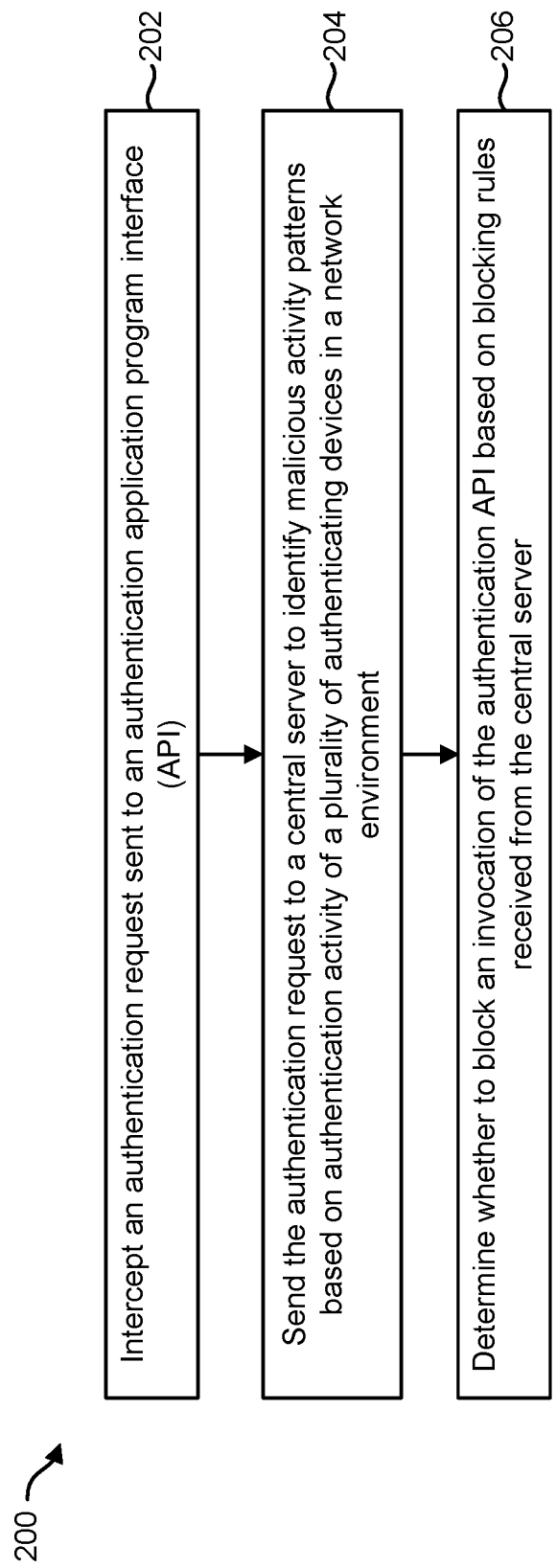
FIG. 2 is a flow diagram illustrating one configuration of a method for detecting and blocking malicious network activity.

FIG. 2 is a flow diagram illustrating one configuration of a method 200 for detecting and blocking malicious network activity. The method 200 may be implemented by an authenticating device 102 in a network environment 100. In an implementation, the authenticating device 102 may be a domain controller configured with an authentication API 110 and an agent module 112. In a Microsoft Windows environment, the authentication API 110 may be a Kerberos protocol API or an NT LAN Manager (NTLM) protocol API.

The authenticating device 102 may intercept 202 an authentication request 108 sent to the authentication API 110. The authentication request 108 may be sent by a calling device 106 seeking to be authenticated by the authentication API 110. The agent module 112 may intercept 202 the authentication request 108 using hook code 114.

The authenticating device 102 may send 204 the authentication request 108 to a central server 104 to identify malicious activity patterns based on recent authentication activity of a plurality of authenticating devices 102 in the network environment 100. For example, the authenticating device 102 may collect authentication request data based on data collection rules 118 received from the central server 104. The authenticating device 102 may filter the authentication request data that is sent to the central server 104 based on filter rules 120 received from the central server 104.

The central server 104 may be configured to receive authentication request data from a plurality of authenticating devices 102. The central server 104 may identify malicious activity patterns based on authentication activity of the plurality of authenticating devices 102 in the network environment 100. This may be accomplished as described in connection with FIG. 3.

The authenticating device 102 may determine 206 whether to block an invocation of the authentication API 110 based on blocking rules 116 received from the central server 104. The authenticating device 102 may apply the authentication request data to the blocking rules 116 to determine whether to block an invocation of the authentication API 110. For example, the authenticating device 102 may determine 206 whether a security principle initiating the authentication request 108, a calling device 106 initiating the authentication request 108 or a resource that the authentication request 108 is seeking to access is included in the blocking rules 116.

When the blocking rules 116 instruct the authenticating device 102 to block the authentication request 108 (e.g., when the authentication request data is included in the blocking rules 116), the authenticating device 102 may block the authentication request 108 from calling the authentication API 110. The authenticating device 102 may then send an access denied message to the calling device 106.

When the blocking rules 116 instruct the authenticating device 102 to permit the authentication request 108, the authenticating device 102 may allow the authentication request 108 to call the authentication API 110. In other words, if the blocking rules 116 do not instruct the authenticating device 102 to block the authentication request 108, the authenticating device 102 may allow the authentication request 108 to pass through.

Figure 3:
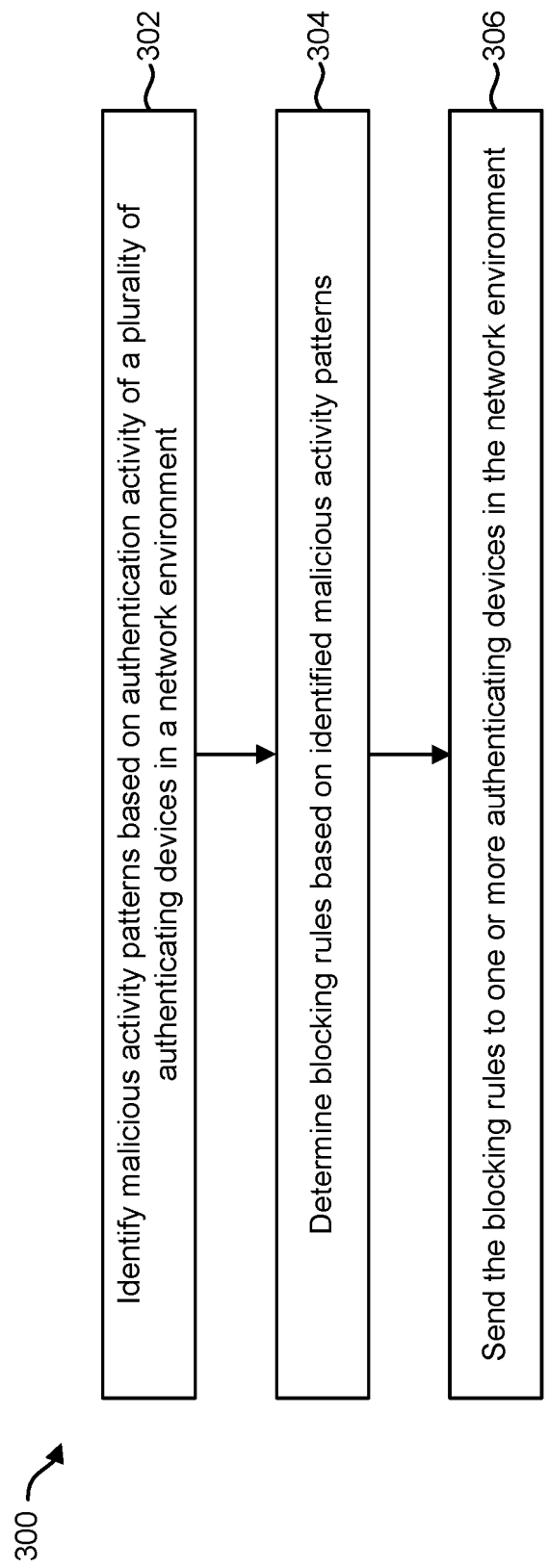
FIG. 3 is a flow diagram illustrating another configuration of a method for detecting and blocking malicious network activity.

FIG. 3 is a flow diagram illustrating another configuration of a method 300 for detecting and blocking malicious network activity. The method 300 may be implemented by a central server 104.

The central server 104 may identify 302 malicious activity patterns based on authentication activity of a plurality of authenticating devices 102 in a network environment 100. The central server 104 may detect abnormal activity by users or malicious software. The central server 104 may do this by monitoring authentication events of multiple authenticating devices 102. For example, one or more authenticating devices 102 may send intercepted authentication request data. The authentication request data may include the user ID, the timestamp of the authentication request, the calling device ID and the authenticating device ID.

The authenticating device 102 may determine whether the authentication activity patterns exceed one or more thresholds that indicate malicious activity. Several types of malicious activity may be detected by the central server 104 through analysis of authentication activity. Examples of malicious activity that may be detected by the central server 104 include brute force attacks (described in connection with FIG. 5), user account hacking (described in connection with FIG. 6), horizontal movement attacks (described in connection with FIG. 7), a bad user ID (described in connection with FIG. 8), a breached password (described in connection with FIG. 9), concurrent logins (described in connection with FIG. 10), impersonation logins (described in connection with FIG. 11) and golden ticket attacks (described in connection with FIG. 12).

The central server 104 may determine 304 blocking rules 116 based on identified malicious activity patterns. The blocking rules 116 instruct an authenticating device 102 to block an authentication request 108 from invoking an authentication API 110. The blocking rules 116 may instruct the authenticating device 102 to block an authentication request 108 based on one or more parameters associated with the authentication request 108. For example, the blocking rules 116 may include the security principle initiating the authentication request 108, a calling device 106 initiating the authentication request 108 or a resource that the authentication request 108 is seeking to access is included in the blocking rules 116. Additionally, the blocking rules 116 may include date or time parameters for blocking an authentication request 108.

The central server 104 may send 306 the blocking rules 116 to one or more authenticating devices 102 in the network environment 100. For example, the central server 104 may send 306 the blocking rules 116 to each authenticating device 102 in the network environment 100. Alternatively, the central server 104 may send 306 the blocking rules 116 to one or more specific authenticating devices 102.

Figure 4:
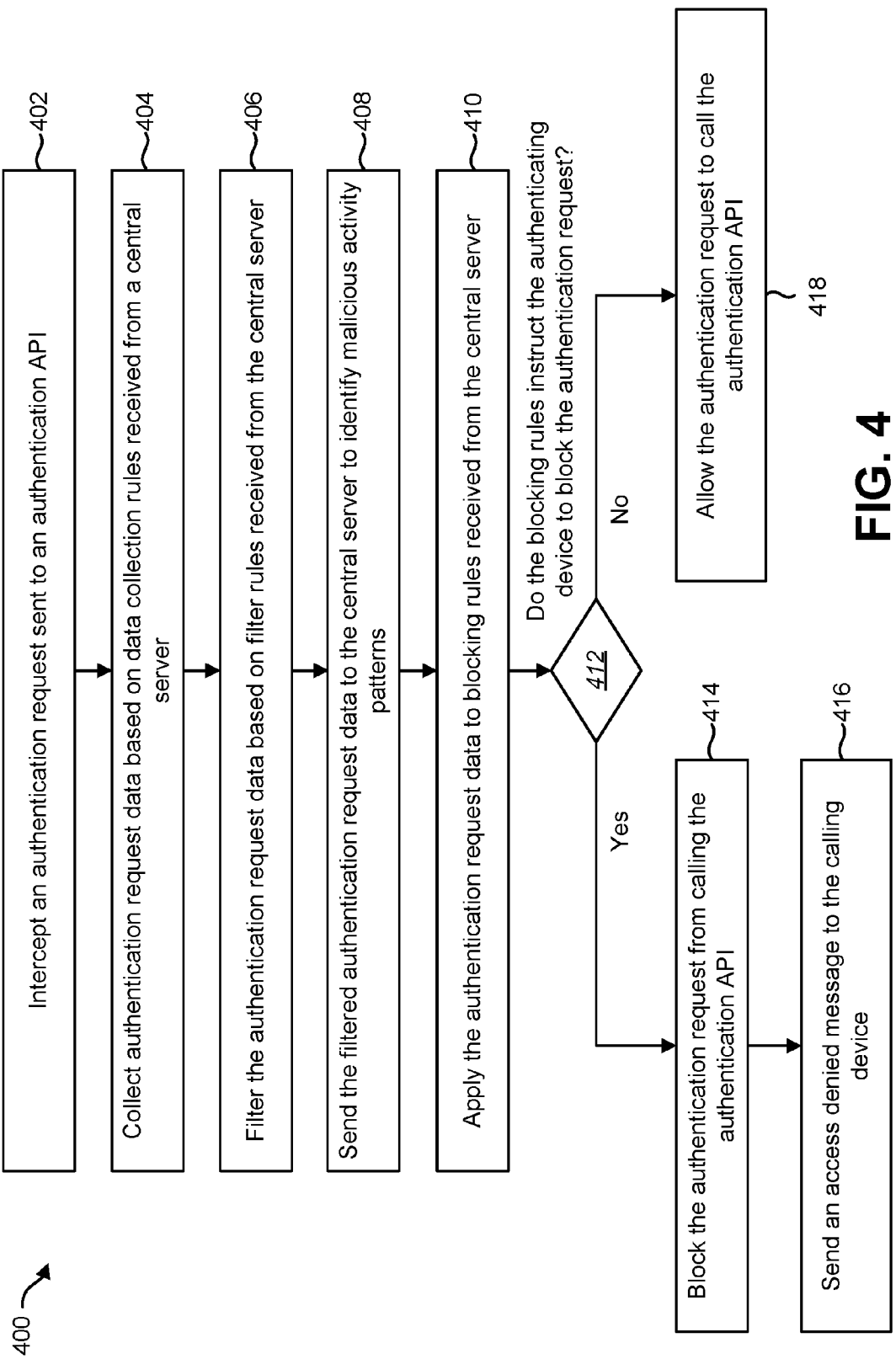
FIG. 4 is a flow diagram illustrating a configuration of a method for detecting and blocking malicious network activity by an authenticating device.

FIG. 4 is a flow diagram illustrating a configuration of a method 400 for detecting and blocking malicious network activity by an authenticating device 102. The method 200 may be implemented by an authenticating device 102 in a network environment 100. In an implementation, the authenticating device 102 may be a domain controller configured with an authentication API 110 and an agent module 112.

The authenticating device 102 may intercept 402 an authentication request 108 sent to the authentication API 110. For example, the authentication request 108 may be sent by a calling device 106 to the authentication API 110 of the authenticating device 102. The agent module 112 may intercept 402 the authentication request 108 using hook code 114.

The authenticating device 102 may collect 404 authentication request data based on data collection rules 118 received from the central server 104. The authenticating device 102 may filter 406 the authentication request data based on filter rules 120 received from the central server 104.

The authenticating device 102 may send 408 the filtered authentication request data to the central server 104. The central server 104 may use the authentication request data to identify malicious activity patterns based on the authentication activity of a plurality of authenticating devices 102 in a network environment 100.

The authenticating device 102 may apply 410 the authentication request data to blocking rules 116 received from the central server 104. As described above, the central server 104 generates the blocking rules 116 and the authenticating device 102 applies the most recently asynchronously received blocking rules 116 to the current hooked authentication request 108. The blocking rules 116 may be received before intercepting 402 the authentication request 108. Therefore, the blocking rules 116 may be stored locally on the authenticating device 102 when the authentication request 108 is received. The authenticating device 102 may use the authentication request data as input to the blocking rules 116.

The authenticating device 102 may determine 412 whether the blocking rules 116 instruct the authenticating device 102 to block the authentication request 108. For example, the authenticating device 102 may determine 412 whether a security principle initiating the authentication request 108, a calling device 106 initiating the authentication request 108 or a resource that the authentication request 108 is seeking to access is included in the blocking rules 116. Additionally, the authenticating device 102 may determine 412 whether the blocking rules 116 indicate blocking based on date or time parameters.

If the authenticating device 102 determines 412 that the blocking rules 116 instruct the authenticating device 102 to block the authentication request 108, then the authenticating device 102 may block 414 the authentication request 108 from calling the authentication API 110. The authenticating device 102 may then send 416 an access denied message to the calling device 106. In an implementation, the hook code 114 may return an access denied error to the calling function of the hooked authentication API 110, the operating system then propagates this access denied error back up through the call stack. This would eventually lead to an access denied message passed back via the operating system to the calling device 106.

If the authenticating device 102 determines 412 that the blocking rules 116 do not instruct the authenticating device 102 to block the authentication request 108, then the authenticating device 102 may allow 418 the authentication request 108 to call the authentication API 110.

Figure 5:
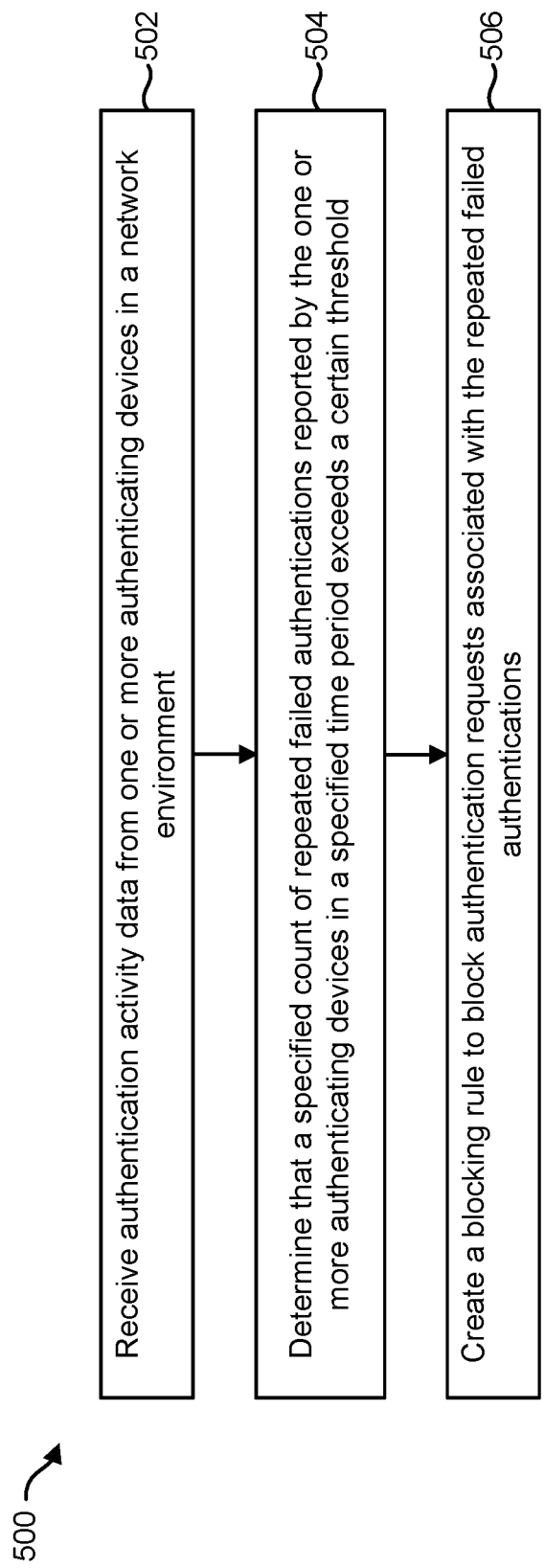
FIG. 5 is a flow diagram illustrating one configuration of a method for detecting a brute force attack.

FIG. 5 is a flow diagram illustrating one configuration of a method 500 for detecting a brute force attack. The method 500 may be implemented by a central server 104. The central server 104 may be configured to communicate with a plurality of authenticating devices 102 in a network environment 100. The method 500 may be implemented to identify malicious activity patterns in the network environment 100.

A brute force attack is a trial-and-error method to obtain access to network resources. An attacker calling device 106 may generate a large number of guesses for authentication credentials that are sent to one or more authenticating devices 102 as authentication requests 108. The attack may continue until one of the guesses is successful. A brute force attack may use the same user account or different user accounts. A brute force attack may originate from the same calling device 106 or from multiple calling devices 106. Therefore, a calling device 106 may be the source of repeated authentication failures.

The central server 104 may receive 502 authentication activity data from one or more authenticating devices 102 in the network environment 100. In this case, one or more authenticating devices 102 may report to the central server 104 when an authentication request 108 fails. The failed authentication reports may include the user ID, the timestamp of the authentication request 108, the calling device ID and the authenticating device ID associated with the failed authentication.

The central server 104 may determine 504 that a specified count of repeated failed authentications reported by one or more authenticating devices 102 in a specified time period exceeds a certain threshold. The failed authentications may be against various systems or other network assets within the network environment 100. For example, each time that an authenticating device 102 reports a failed authentication, the central server 104 may increment a counter. When the count exceeds a threshold, the central server 104 may declare a malicious activity pattern. Because the failed authentications may be reported from multiple authenticating devices 102, the central server 104 may identify a brute force attack that is distributed throughout a network environment 100.

The central server 104 may create 506 a blocking rule 116 to block authentication requests 108 associated with the repeated failed authentications. For example, the blocking rule 116 may block the security principle (user or service account) initiating the failed authentication requests 108, the calling device 106 initiating the failed authentication requests 108, or a resource (e.g., file share, RDP session, etc.) that the failed authentication request 108 is seeking to access.

It should be noted that with this approach to detect a brute force attack, a blocking rule 116 is put in place so that the next attempt, instead of being processed by the OS, will be blocked by the authenticating device 102. Thus, the authentication API 110 is prevented from responding to continued attempts, one of which might eventually have a valid password resulting in network access. It should also be noted that a brute force attack is looking for examples in which the username and/or password are invalid for the target environment (resulting in a failed authentication attempt).

Figure 6:
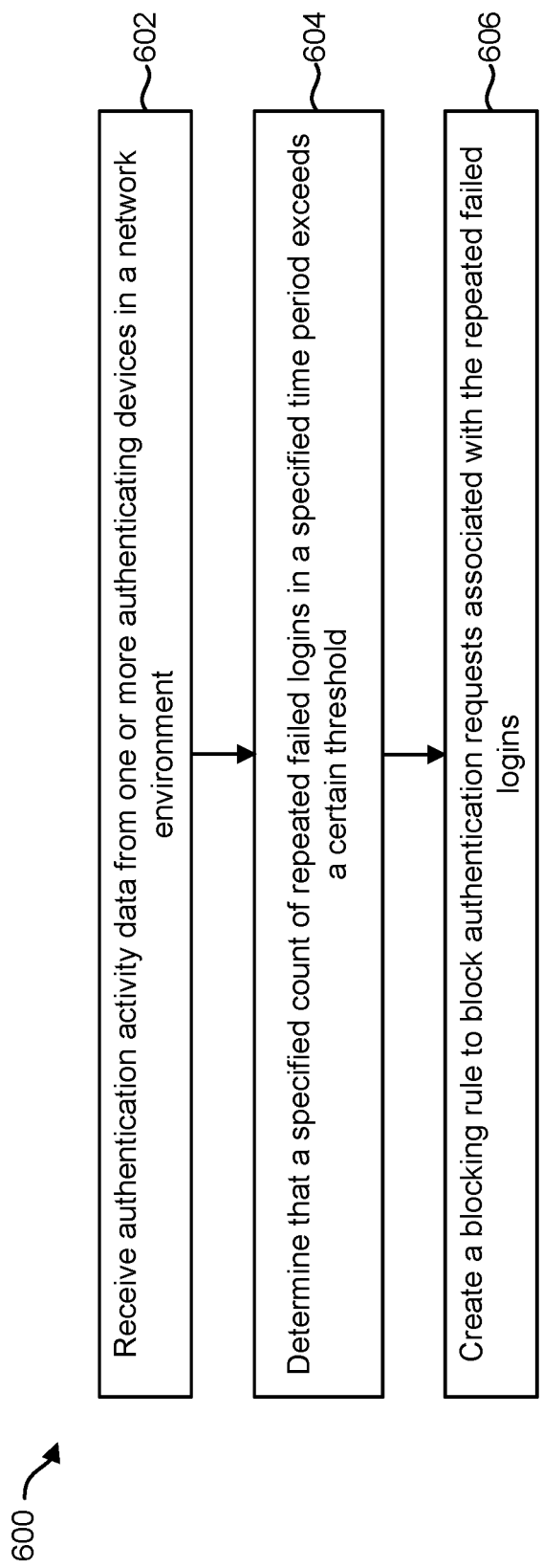
FIG. 6 is a flow diagram illustrating one configuration of a method for detecting user account hacking.

FIG. 6 is a flow diagram illustrating one configuration of a method 600 for detecting user account hacking. The method 600 may be implemented by a central server 104. The central server 104 may be configured to communicate with a plurality of authenticating devices 102 in a network environment 100. The method 600 may be implemented to identify malicious activity patterns in the network environment 100.

User account hacking is a trial-and-error method to obtain access to network resources. An attacker (e.g., a human or automated process) may generate a large number of guesses of a user's password. The attacker may try multiple authentications with different passwords in an attempt to break the password. A user account hacking may originate from the same calling device 106 or from multiple calling devices 106. User account hacking differs from a brute force attack in that the attacker is using the same valid username but guessing repeatedly at the unknown password.

The user account hacking attempts may be timed to avoid triggering operating system lockout thresholds. For example, an operating system may lockout a user account if there are more than five failed logins within a minute. The user account hacking may be timed to only perform one login attempt each minute. Additionally, the user account hacking may occur on different authenticating devices 102 so as to avoid triggering account lockout.

The central server 104 may receive 602 authentication activity data from one or more authenticating devices 102 in the network environment 100. In this case, one or more authenticating devices 102 may report to the central server 104 when an authentication request 108 fails. The central server 104 may receive failed login reports from one or more authenticating devices 102. The authenticating device 102 may include the user ID, the timestamp of the authentication request 108, the calling device ID and the authenticating device ID associated with the failed login. In this case, the user ID may be the same for each report.

The central server 104 may determine 604 that a specified count of repeated failed logins in a specified time period exceeds a certain threshold. For example, each time that an authenticating device 102 reports a failed login for a given user account, the central server 104 may increment a counter associated with that user account. When the count exceeds a threshold in a specified time period, the central server 104 may declare a malicious activity pattern. The specified time period and threshold used by the central server 104 may be more or less than the operating system lockout thresholds.

Because the failed logins may be reported from multiple authenticating devices 102, the central server 104 may identify a user account hacking attack that is distributed across multiple authenticating devices 102 throughout a network environment 100. Additionally, each authenticating device 102 may be responding to authentication attempts 108 from one or more calling devices 106. Furthermore, the central server 104 may identify user account hacking that is timed to avoid triggering account lockout. A smart hacking program may put time delays between its attempts so that it will only try once per minute, but it will try for hours at a time. The central server 104 may trigger an alarm if there are, for example, 50 failed passwords in a 24-hour period. Therefore, even though the frequency of the failed logins is not enough to trigger the built-in operating system rule, the central server 104 may still identify nefarious behavior.

The central server 104 may create 606 a blocking rule 116 to block authentication requests 108 associated with the repeated failed logins. In this case, the user account initiating the failed logins may be the same. Therefore, the blocking rules 116 may block this user account. Additionally, the blocking rule 116 may block the calling device(s) 106 initiating the failed logins, or a resource (e.g., file share, RDP session, etc.) that the failed logins are seeking to access.

Figure 7:
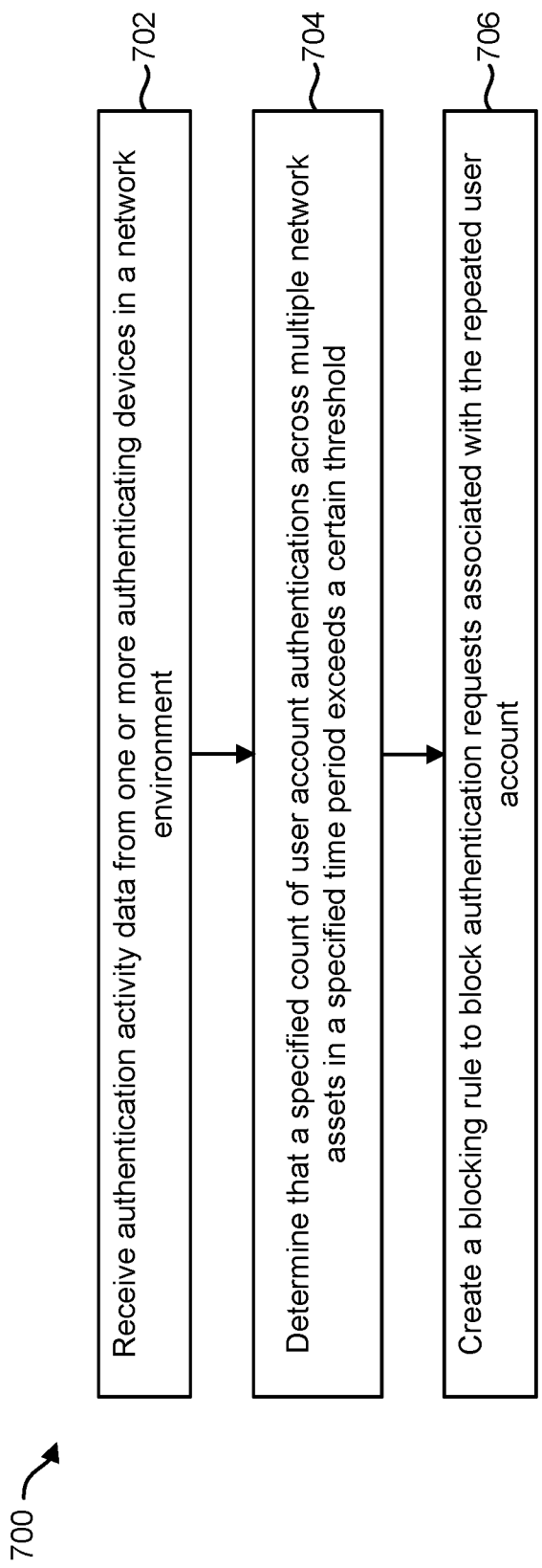
FIG. 7 is a flow diagram illustrating one configuration of a method for detecting horizontal movement attacks.

FIG. 7 is a flow diagram illustrating one configuration of a method 700 for detecting horizontal movement attacks. The method 700 may be implemented by a central server 104. The central server 104 may be configured to communicate with a plurality of authenticating devices 102 in a network environment 100. The method 700 may be implemented to identify malicious activity patterns in the network environment 100.

Horizontal movement attacks involve a trusted insider that exploits valid user credentials to access network resources in an inappropriate manner. The attacker may be a trusted employee with valid credentials. In setting up network environments 100, an administrator may not adequately lock down network resources.

Once an attacker is in a network legitimately, they may go to places where they should not be. For example, disgruntled employees or people trying to steal information may have access to much more than they should or need to do their job. This may come down to IT departments that do not have the time or the infrastructure to know who should have access to what, so people tend to be greatly over privileged for their job.

In a large network environment 100, it is very common also over time to accumulate network privileges. For example, when a user is in a particular department, the user may be granted access to resources for that particular department. If the user is transferred to another department, the user may be provisioned access to the resources for this new department, but very seldom do they remove the user's access from the previous department. As the user moves around through a company, the user may end up with an aggregation of rights.

The central server 104 may receive 702 authentication activity data from one or more authenticating devices 102 in the network environment 100. In this case, one or more authenticating devices 102 may report to the central server 104 successful user logins. The authenticating device 102 may include the user ID, the timestamp of the authentication request 108, the calling device ID and the authenticating device ID associated with the failed authentication. In this case, the user ID may be the same for each report.

The central server 104 may determine 704 that a specified count of user account authentications across multiple network assets in a specified time period exceeds a certain threshold. For example, each time that an authenticating device 102 reports a user account authentication to different network resources (e.g., file servers), the central server 104 may increment a counter associated with that user account. When the count exceeds a threshold in a specified time period, the central server 104 may declare a malicious activity pattern. In other words, the central server 104 may identify that a valid user account is accessing more network resources than allowed within a time period.

Because the multiple successful logins may be reported from multiple authenticating devices 102, the central server 104 may identify horizontal movement attacks that are distributed across multiple authenticating devices 102 throughout a network environment 100. Additionally, these multiple successful authentications 108 may have originated from one or more calling devices 106.

The central server 104 may create 706 a blocking rule 116 to block authentication requests 108 associated with the user account. In this case, the user account initiating the multiple logins is the same. Therefore, the blocking rules 116 may block this user account. Additionally, the blocking rule 116 may block the calling device(s) 106 initiating the successful logins.

Figure 8:
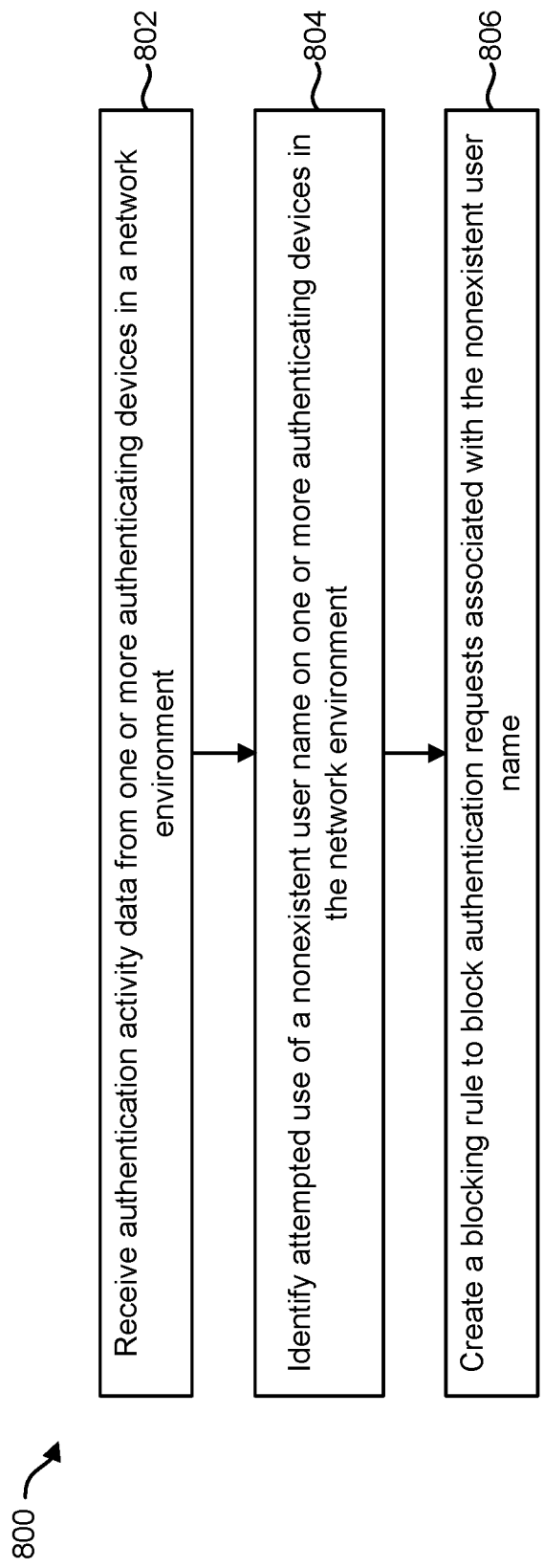
FIG. 8 is a flow diagram illustrating one configuration of a method for detecting a bad user ID.

FIG. 8 is a flow diagram illustrating one configuration of a method 800 for detecting a bad user ID. The method 800 may be implemented by a central server 104. The central server 104 may be configured to communicate with a plurality of authenticating devices 102 in a network environment 100. The method 800 may be implemented to identify malicious activity patterns in the network environment 100.

A bad user ID is an example of pre-authentication failures due to attempted use of nonexistent user names in an authentication request 108. This may be due to a misconfigured service that has the wrong user name. This may not necessarily be a security attack, but it does overload network resources with the cost of authentication failures. This could also be an indication of an attack where an attacker is trying to guess a user name and password to gain access.

The central server 104 may receive 802 authentication activity data from one or more authenticating devices 102 in the network environment 100. In this case, one or more authenticating devices 102 may report to the central server 104 authentication requests 108 that include a nonexistent user name.

The central server 104 may identify 804 attempted use of a nonexistent user name on one or more authenticating devices 102 in the network environment 100. For example, if the central server 104 determines that the same nonexistent user name occurs a certain number of times within a certain time period, the central server 104 may declare a malicious activity pattern.

The central server 104 may create 806 a blocking rule 116 to block authentication requests 108 associated with the nonexistent user name. In this case, the user account initiating the multiple logins is the same. Therefore, the blocking rules 116 may block this user account. Additionally, the blocking rule 116 may block the calling device 106 initiating the authentication requests 108 with the bad user ID.

Figure 9:
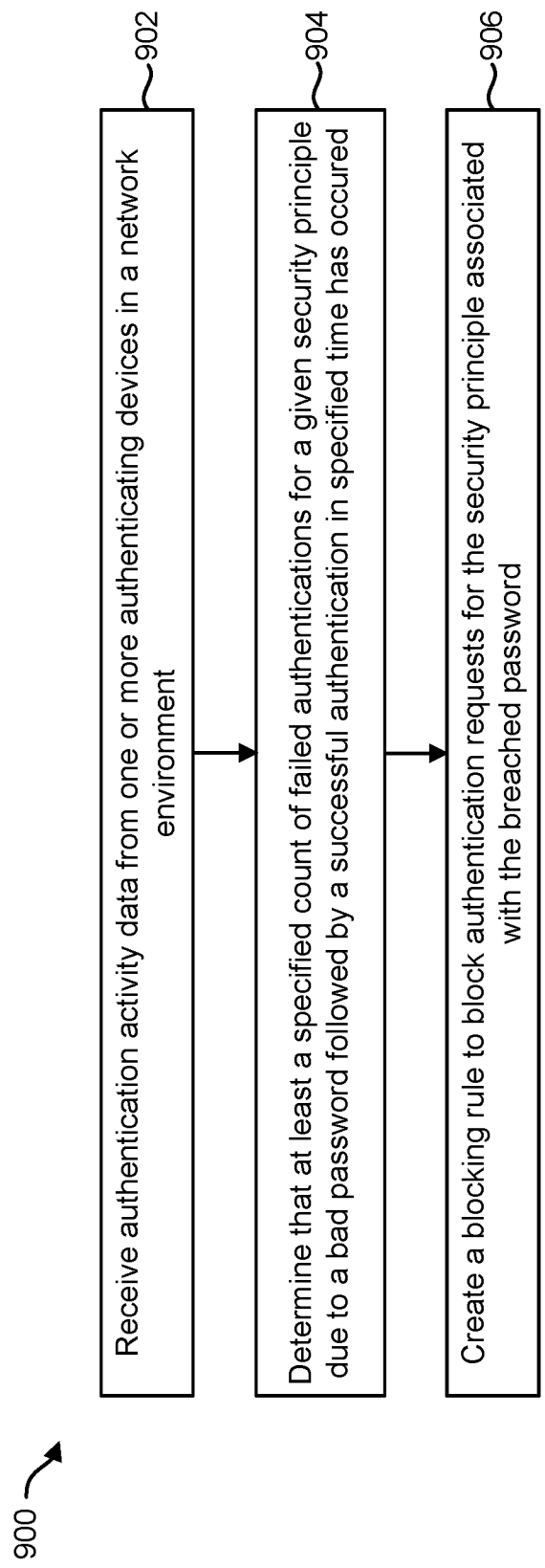
FIG. 9 is a flow diagram illustrating one configuration of a method for detecting a breached password.

FIG. 9 is a flow diagram illustrating one configuration of a method 900 for detecting a breached password. The method 900 may be implemented by a central server 104. The central server 104 may be configured to communicate with a plurality of authenticating devices 102 in a network environment 100. The method 900 may be implemented to identify malicious activity patterns in the network environment 100.

A breached password may occur as a result of a successful brute force attack or user account hacking. In this case, the attacker may successfully acquire a valid password for a given user name after a series of failed authentications.

The central server 104 may receive 902 authentication activity data from one or more authenticating devices 102 in the network environment 100. One or more authenticating devices 102 may report failed authentications to the central server 104 followed by a successful authentication. In this case, the authentication requests 108 are associated with the same security principle (e.g., user ID).

The central server 104 may determine 904 that at least a specified count of failed authentications for a given security principle due to a bad password followed by a successful authentication in specified time has occurred. For example, each time that an authenticating device 102 reports a failed login for a given user account, the central server 104 may increment a counter associated with that user account. The central server 104 may keep the count of failed logins for a certain period of time. If a successful authentication (e.g., correct password) occurs after a number of failed logins, the central server 104 may declare a malicious activity pattern. This may indicate that the password was breached.

The central server 104 may create 906 a blocking rule 116 to block authentication requests 108 for the security principle associated with the breached password. In this case, the security principle (e.g., user account) initiating the logins is the same. Therefore, the blocking rules 116 may block this security principle. Additionally, the blocking rule 116 may block the calling device 106 initiating the logins, or a resource (e.g., file share, RDP session, etc.) that the logins are seeking to access.

Figure 10:
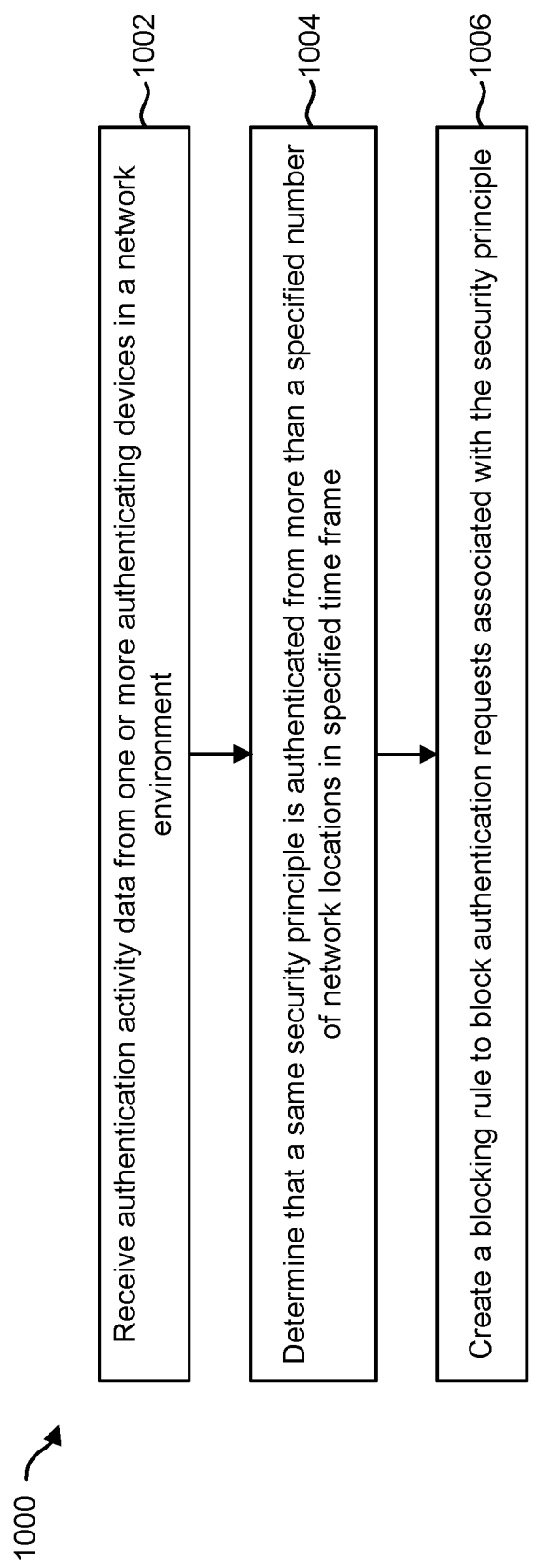
FIG. 10 is a flow diagram illustrating one configuration of a method for detecting concurrent logins.

FIG. 10 is a flow diagram illustrating one configuration of a method 1000 for detecting concurrent logins. The method 1000 may be implemented by a central server 104. The central server 104 may be configured to communicate with a plurality of authenticating devices 102 in a network environment 100. The method 1000 may be implemented to identify malicious activity patterns in the network environment 100.

Concurrent logins may occur when the same security principle is authenticated from multiple locations (e.g., calling devices 106). The same security principle may be authenticated from the multiple locations at the same time or within a certain period of time. For example, the same user account may be used to log into the network environment 100 from multiple locations.

There are at least two use cases for this type of activity detection. In one case, a valid user may try to access more resources than they should and are seeking to hide this by spreading access around to multiple calling devices 106. In another case, multiple bad actors that are separated by a geographic distance may be logged in concurrently. In this case, the geographic location of calling devices 106 in a WAN may be known. If it is observed that the same user credentials are used to authenticate or log in at the same time or within a specified time frame from two geographically separated devices and within a time frame that precludes travel between those devices, then this could suggest compromised credentials that in fact are being used by different bad actors.

The central server 104 may receive 1002 authentication activity data from one or more authenticating devices 102 in the network environment 100. In this case, one or more authenticating devices 102 may report successful authentication of the same security principle from multiple network locations. The authentication requests 108 are associated with the same security principle (e.g., user ID). However, the calling devices 106 initiating the authentication requests 108 may differ.

The central server 104 may determine 1004 that a same security principle is authenticated from more than a specified number of network locations in a specified time frame. For example, each time that an authenticating device 102 reports a successful authentication for a security principle from a different network location, the central server 104 may increment a counter associated with that security principle. The central server 104 may keep this count for a certain period of time. If this count exceeds a threshold number within the specified time frame, the central server 104 may declare a malicious activity pattern.

In another approach, the central server 104 may query a map service (e.g., Google Maps) to get a travel time between the calling devices 106. The central server 104 may use these times as part of threshold logic to trigger rule generation or an alert to the IT department.

The central server 104 may create 1006 a blocking rule 116 to block authentication requests 108 associated with the security principle. In this case, the security principle (e.g., user account) initiating the logins is the same. Therefore, the blocking rules 116 may block this security principle. Additionally, the blocking rule 116 may block the calling device(s) 106 initiating the logins, or a resource (e.g., file share, RDP session, etc.) that the logins are seeking to access.

Figure 11:
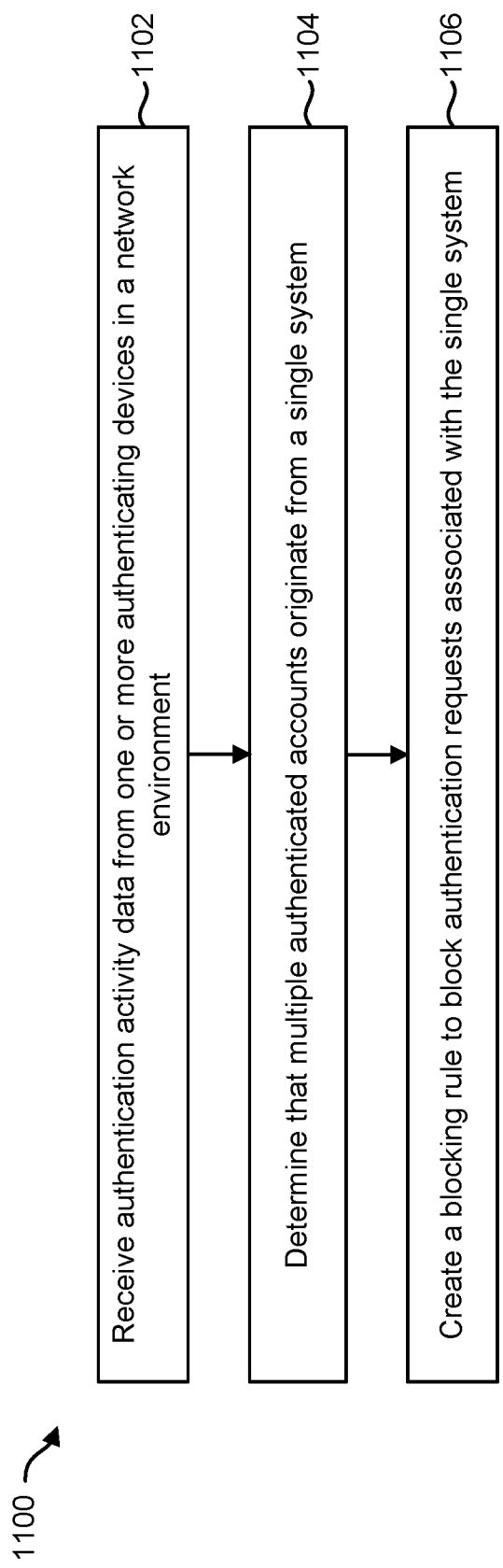
FIG. 11 is a flow diagram illustrating one configuration of a method for detecting impersonation logins.

FIG. 11 is a flow diagram illustrating one configuration of a method 1100 for detecting impersonation logins. The method 1100 may be implemented by a central server 104. The central server 104 may be configured to communicate with a plurality of authenticating devices 102 in a network environment 100. The method 1100 may be implemented to identify malicious activity patterns in the network environment 100.

The central server 104 may receive 1102 authentication activity data from one or more authenticating devices 102 in the network environment 100. In this case, one or more authenticating devices 102 may report successful authentication of the multiple accounts from a single system (e.g., calling device 106). The authentication requests 108 may be associated with the different security principles. However, the calling device 106 initiating the authentication requests 108 may be the same.

The central server 104 may determine 1104 that multiple authenticated accounts originate from a single system. For example, when the central server 104 determines that multiple successful authentication requests 108 for different accounts originate from the same calling device 106, the central server 104 may declare a malicious activity pattern.

The central server 104 may create 1106 a blocking rule 116 to block authentication requests 108 associated with the single system. In this case, the calling device 106 initiating the authentications is the same. Therefore, the blocking rules 116 may block this calling device 106. Additionally, the blocking rule 116 may block the security principles initiating the logins, or a resource (e.g., file share, RDP session, etc.) that the logins are seeking to access.

Figure 12:
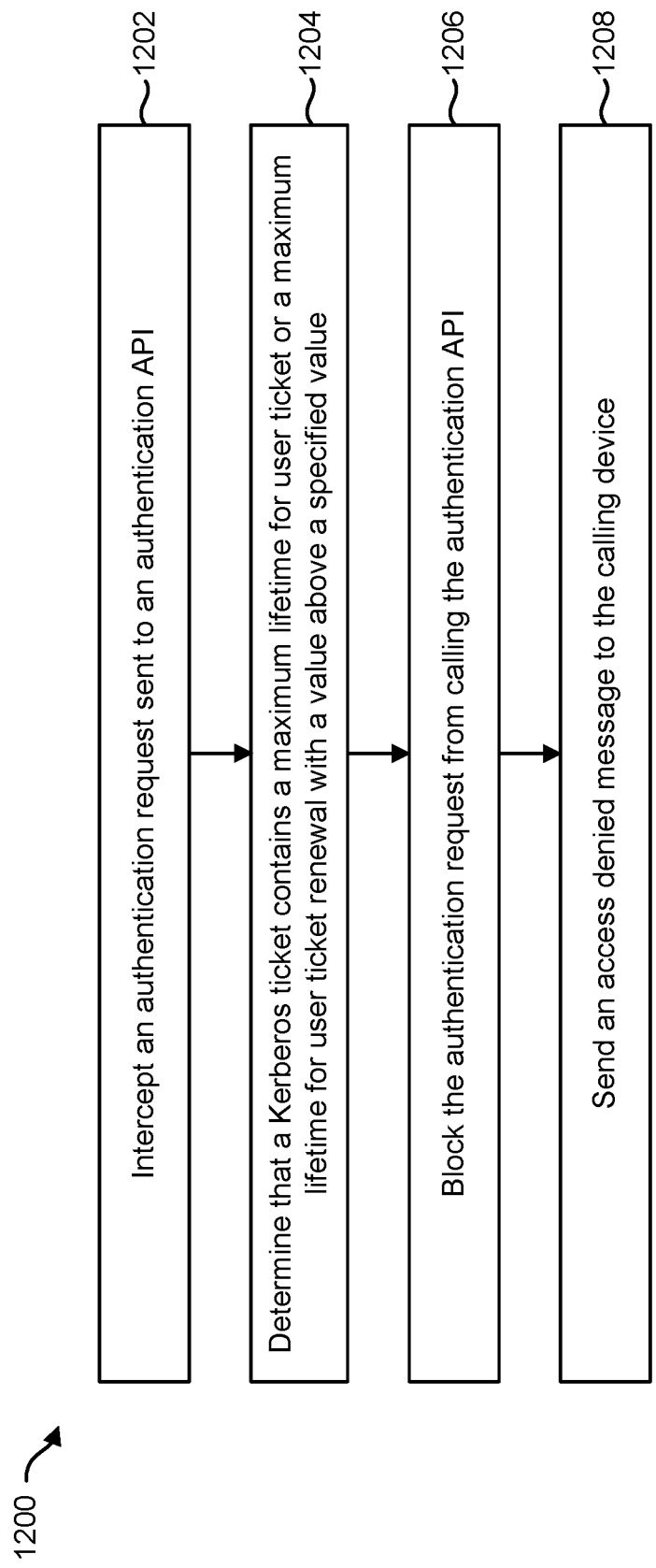
FIG. 12 is a flow diagram illustrating one configuration of a method for detecting and blocking golden ticket attacks.

FIG. 12 is a flow diagram illustrating one configuration of a method 1200 for detecting and blocking golden ticket attacks. The method 1200 may be implemented by an authenticating device 102. The authenticating device 102 may be configured to communicate with a central server 104 in a network environment 100.

As described above, in the case of a Kerberos protocol, the authentication API 110 may issue a Kerberos ticket to the calling device 106 with which the calling device 106 gains access to network resources. In Kerberos, when a calling device 106 is authenticated to the domain controller, the calling device 106 receives a ticket from Kerberos that is good for a particular amount of time. The Kerberos ticket may have a "maximum lifetime for user ticket" value and a "maximum lifetime for user ticket renewal" value.

Once the calling device 106 has a Kerberos ticket, the calling device 106 may present the Kerberos ticket to another network resource, which looks at the timestamp to see if the ticket has expired. If the ticket is expired, then the calling device 106 has to re-authenticate with the authenticating device 102 to get a new ticket.

In a golden ticket attack, an attacker obtains a copy of a valid ticket and then modifies the ticket to have a different expiration time. The native authentication API 110 may not check to see if that ticket has been tampered with. An attacker, therefore, modifies the time so that it never expires. Then the attacker can use that ticket later.

To combat a golden ticket attack, the authenticating device 102 may intercept 1202 an authentication request 108 sent to an authentication API 110. This may be accomplished as described in connection with FIG. 2. For example, an agent module 112 may hook the function call to the authentication API 110. The authentication request 108 may include a Kerberos ticket.

The authenticating device 102 may determine 1204 that a Kerberos ticket contains a maximum lifetime for user ticket or a maximum lifetime for user ticket renewal with a value above a specified value. For example, the blocking rules 116 received from the central server 104 may include allowed values for the maximum lifetime for user ticket or maximum lifetime for user ticket renewal. Alternatively, the specified value may be the local domains default values. The agent module 112 may look at the value(s) contained in the Kerberos ticket to determine whether the value(s) are greater than the specified value.

The authenticating device 102 may block 1206 the authentication request 108 from calling the authentication API 110. The authenticating device 102 may then send 1208 an access denied message to the calling device 106.

Figure 13:
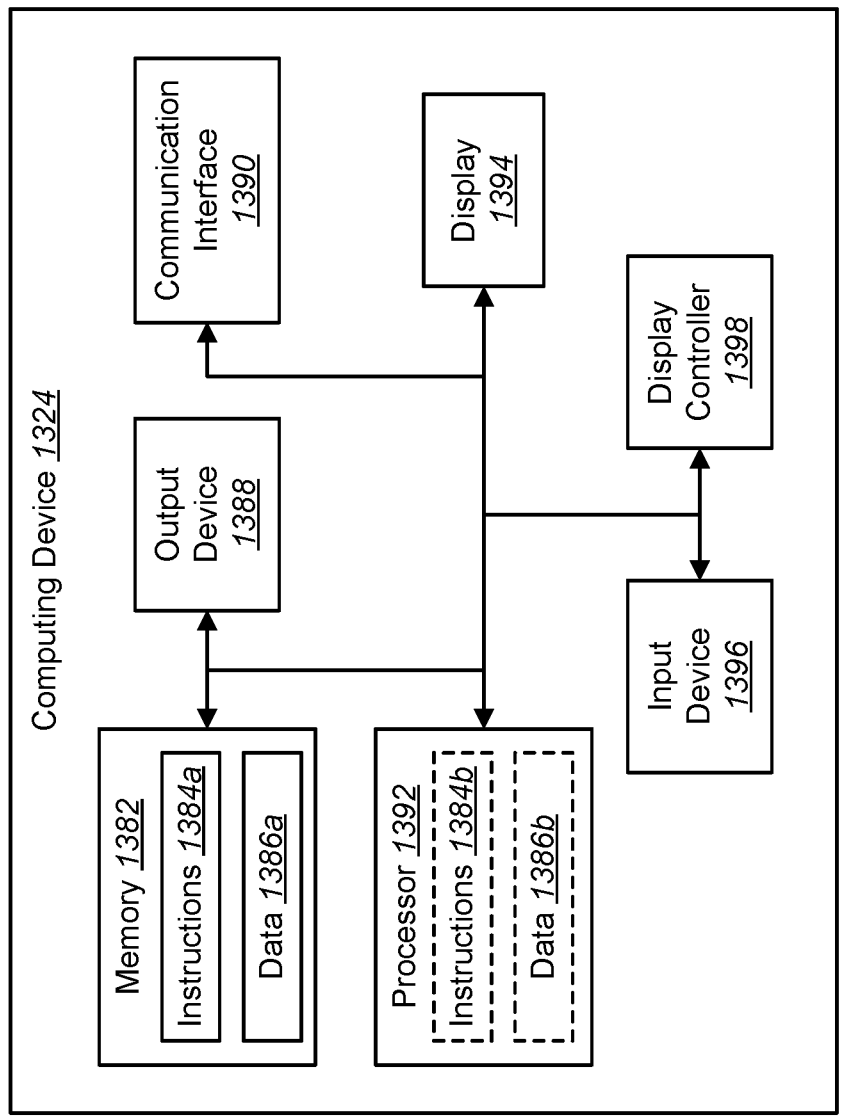
FIG. 13 is a block diagram illustrating components that may be utilized by a computing device.

FIG. 13 is a block diagram illustrating components that may be utilized by a computing device 1324. The computing device 1324 may be configured in accordance with one or more of the authenticating devices 102 or central server 104 described herein.

The computing device 1324 may communicate with other electronic devices through one or more communication interfaces 1390. Communication through the communication interface 1390 may be achieved through different methods such as wired communication, wireless communication or both wired and wireless communication. For example, the communication interface 1390 may be a serial port, a parallel port, a Universal Serial Bus (USB), an Ethernet adapter, an IEEE bus interface, a small computer system interface (SCSI) bus interface, an infrared (IR) communication port, a Bluetooth wireless communication adapter and so forth.

The computing device 1324 may receive and transmit information through one or more input devices 1396 and one or more output devices 1388. The input devices 1396 may be a keyboard, mouse, microphone, remote control device, button, joystick, trackball, touchpad, lightpen, etc. The output devices 1388 may be a speaker, printer, etc. A display device 1394 is an output device that may be included in a computer system. Display devices 1394 may project information through different technologies, such as liquid crystal display (LCD), light-emitting diode (LED), gas plasma, electroluminescence, a cathode ray tube (CRT) or the like.

A processor 1392 controls the operation of the computing device 1324 and may be a microprocessor, a microcontroller, a digital signal processor (DSP) or other device known in the art. A memory 1382 may be included in the computing device 1324 and includes instructions 1384a and data 1386a to assist the processor 1392 in operating the computing device 1324. The memory 1382 may send program instructions 1384b and/or data 1386b to the processor 1392 in order for the processor 1392 to perform logical and arithmetic operations according to methods disclosed herein. The processor 1392 may execute one or more of the instructions stored in the memory 1382 to implement one or more of the systems and methods disclosed herein.

Data 1386a stored in the memory 1382 may be converted to text, graphics and/or moving images (as appropriate) by a display controller 1398. Of course, FIG. 13 illustrates only one possible configuration of a computing device 1324. Various other architectures and components may be utilized.

In this application, various terms have been connected to reference numbers. The reference numbers are for an element in the one or more Figures. If a term is not connected to a reference number, the term is meant more generally and without limitation to any particular Figure.

In this application, the term "determining" has been used. The term "determining" is meant to cover several different actions and, therefore, some examples of "determining" are computing, calculating, processing, investigating, looking up (e.g., looking up in a table, a database or another data structure), ascertaining and the like. The term "determining" also covers resolving, selecting, choosing, establishing and the like. The term "determining" can also cover receiving information or accessing information.

In this application, the term "based on" means more than "based only on," except where expressly stated. The term "based on" describes both "based only on" and "based at least on."

In this application, the term "processor" is meant to be broadly interpreted and covers a general purpose processor, a central processing unit (CPU), a microprocessor, a digital signal processor (DSP), a controller, a microcontroller, a state machine, and so forth. Under some circumstances, a "processor" may refer to an application specific integrated circuit (ASIC), a programmable logic device (PLD), a field programmable gate array (FPGA), etc. The term "processor" may also be a combination of several processing devices, e.g., a combination of a DSP and a microprocessor, a plurality of microprocessors, one or more microprocessors in conjunction with a DSP core, or any other such configuration.

In this application, the term "memory" is meant to be broadly interpreted and covers electronic storage devices capable of storing information electronically. The term "memory" covers various types of memory technology such as programmable read-only memory (PROM), random access memory (RAM), read-only memory (ROM); erasable programmable read only memory (EPROM), non-volatile random access memory (NVRAM), electrically erasable PROM (EEPROM), flash memory, magnetic or optical data storage, registers, etc. A processor and memory are in electronic communication, where the processor can read or write information located within the memory. Memory that is integral to a processor is in electronic communication with the processor.

In this application, the terms "instructions" and "code" are meant to be broadly interpreted and cover code or statements that are computer-readable. For example, the terms "instructions" and "code" may cover programs, routines, sub-routines, functions, procedures, etc. of assembly language code or intermediate language code.

In this application, the term "computer-readable medium" covers any available medium that a computer or processor can access. For example, a computer-readable medium may comprise optical disk storage such as RAM, ROM, EEPROM, CD-ROM, any magnetic disk storage devices, or any other medium for carrying or storing instructions and code that can be accessed by a computer or processor. A computer-readable medium may be non-transitory and tangible. The terms "disk" and "disc" cover compact disc (CD), laser disc, optical disc, digital versatile disc (DVD), floppy disk and Blu-ray® disc disks typically are used for data magnetically accessible, and discs typically are used for data optically accessible through lasers.

Instructions and code may be transmitted over a transmission medium. Instructions and code may also be called software. For example, software may be transmitted from a website, server, or other remote source. The transmission medium may be a coaxial cable, fiber optic cable, twisted pair, digital subscriber line (DSL), or wireless technologies such as infrared, radio, and microwave.

In this application, the methods comprise steps or actions for achieving the functions and processes described above. The method steps are to be understood as interchangeable with one another. The interchanging of a step is not to be understood as departing from the scope of the claims. In this application, the order of steps and actions may be modified and not depart from the scope of the claims, unless a specific order is stated for the steps or actions being described.

The claims are to be understood to not be limited to the exact configuration and components discussed above. The claims are to be understood to cover any reasonable modifications, changes and variations of the arrangement, operation and details of the systems, methods, and apparatus described herein.

What is claimed is:

1. An authenticating device configured for network-authentication, comprising:
   a processor;
   a memory in electronic communication with the processor;
   instructions stored in the memory, the instructions being executable to:
      intercept, at the authenticating device, an authentication request sent to an authentication application program interface (API), wherein the authenticating device comprises a domain controller configured with the authentication API and an agent module, wherein the agent module comprises:
         a hook that intercepts the authentication request;
         data collection rules that are used to determine what authentication request data to scrape from the intercepted authentication request; and
         filter rules that filter the authentication request data that is sent to a central server;
      send, from the authenticating device, the filtered authentication request data to the central server to identify malicious activity patterns of authentication activity spanning across a plurality of authenticating devices in a network environment; and
      determine, at the authenticating device, whether to block an invocation of the authentication API based on blocking rules received from the central server,
      wherein the agent module determines, for every authentication request intercepted in the authenticating device, whether to block a respective authentication request from invoking the authentication API without waiting for a response from the central server for the respective authentication request.

2. The authenticating device of claim 1, wherein when the blocking rules instruct the authenticating device to block the authentication request, the instructions are further executable to:
   block the authentication request from calling the authentication API; and
   send an access denied message to a calling device.

3. The authenticating device of claim 1, wherein when the blocking rules instruct the authenticating device to permit the authentication request, the instructions are further executable to:
   allow the authentication request to call the authentication API.

4. The authenticating device of claim 1, wherein the agent module also sends the authentication request to the central server for centralized blocking rule creation, wherein if an authentication request is blocked then a message is sent to the central server for centralized reporting or alerting IT personnel about blocked operations.

5. The authenticating device of claim 1, wherein the authentication API is a Kerberos protocol API or NT LAN Manager (NTLM) protocol API in a Microsoft Windows environment.

6. The authenticating device of claim 1, wherein the instructions are further executable to determine that a Kerberos ticket contains a maximum lifetime for user ticket or a maximum lifetime for user ticket renewal with a value above a value specified by the blocking rules.

7. The authenticating device of claim 1, wherein the blocking rules instruct the authenticating device to block the authentication request based on a security principle initiating the authentication request, a calling device initiating the authentication request or a resource that the authentication request is seeking to access.

8. The authenticating device of claim 1, wherein when the blocking rules instruct the authenticating device to block the authentication request, the instructions are further executable to:
cause a lower level API to return a reserved value to an upper level API, wherein the reserved value causes the upper level API to return an access denied signal to the authentication request, and wherein the reserved value is not used in native operation of the authentication API.

9. The authenticating device of claim 1, wherein the authentication request data comprises at least one element selected from the group consisting of: a user identification, a timestamp of the authentication request, a calling device identification, an authenticating device identification, a target network resource being requested and a type of access being requested.

10. The authenticating device of claim 1, wherein the type of access being requested indicates that a calling device is attempting to access files on a network share, map a drive to the network share, initiate a remote desktop protocol (RDP) session to another computer, or access the registry of another computer.

11. A method for network authentication by an authenticating device, comprising:
intercepting, at the authenticating device, an authentication request sent to an authentication application program interface (API), wherein the authenticating device comprises a domain controller configured with the authentication API and an agent module,
wherein the agent module comprises:
a hook that intercepts the authentication request;
data collection rules that are used to determine what authentication request data to scrape from the intercepted authentication request; and
filter rules that filter the authentication request data that is sent to a central server;
sending, from the authenticating device, the authentication request to the central server to identify malicious activity patterns of authentication activity spanning across a plurality of authenticating devices in a network environment; and
determining, at the authenticating device, whether to block an invocation of the authentication API based on blocking rules received from the central server,
wherein the agent module determines, for every authentication request intercepted in the authenticating device, whether to block a respective authentication request from invoking the authentication API without waiting for a response from the central server for the respective authentication request.

12. A central server, comprising:
a processor;
a memory in electronic communication with the processor;
instructions stored in the memory, the instructions being executable to:
receive filtered authentication data from a first authenticating device that comprises a domain controller configured with an authentication API and an agent module, wherein the agent module comprises:
a hook that intercepts an authentication request;
data collection rules that are used to determine what authentication request data to scrape from the intercepted authentication request; and
filter rules that filter the authentication request data to produce the filtered authentication data that is received by the central server;
wherein, for every transmission of filtered authentication data received by the central server from the first authenticating device, the central server responds to the first authenticating device after the first authenticating device determines, using blocking rules locally stored at the first authenticating device, whether to block an authentication request associated with a respective transmission from invoking the authentication API in the first authenticating device;
identify malicious activity patterns of authentication activity spanning across a plurality of authenticating devices in a network environment;
determine updated blocking rules based on identified malicious activity patterns, wherein the updated blocking rules instruct the first authenticating device about which authentication requests to block from invoking the authentication application program interface (API); and
send the updated blocking rules to the first authenticating device.

13. The central server of claim 12, wherein identifying malicious activity patterns comprises determining that a specified count of repeated failed authentications reported by one or more authenticating devices in a specified time period exceeds a certain threshold.

14. The central server of claim 12, wherein identifying malicious activity patterns comprises determining that a specified count of repeated failed logins against a given authenticating device in a specified time period exceeds a certain threshold.

15. The central server of claim 12, wherein identifying malicious activity patterns comprises determining that a specified count of user account authentications across multiple network assets in a specified time period exceeds a certain threshold.

16. The central server of claim 12, wherein identifying malicious activity patterns comprises identifying attempted use of a nonexistent user name on one or more authenticating devices in the network environment.

17. The central server of claim 12, wherein identifying malicious activity patterns comprises determining that at least a specified count of failed authentications for a given security principle due to a bad password followed by a successful authentication in a specified time has occurred.

18. The central server of claim 12, wherein identifying malicious activity patterns comprises determining that a same security principle is authenticated from more than specified network locations in a specified time frame.

19. The central server of claim 12, wherein identifying malicious activity patterns comprises determining that multiple authenticated accounts originate from a single system.

20. The central server of claim 12, wherein the blocking rules instruct an authenticating device to block an authentication request based on a security principle initiating the authentication request, a calling device initiating the authentication request or a resource that the authentication request is seeking to access.

21. The central server of claim 12, wherein the instructions are further executable to:

send data collection rules to one or more authenticating devices indicating authentication request data to be collected; and send filter rules to one or more authenticating devices indicating how to filter the authentication request data that is sent to the central server.

22. A method by a central server, comprising:

receiving filtered authentication data from a first authenticating device that comprises a domain controller configured with an authentication API and an agent module, wherein the agent module comprises:

a hook that intercepts an authentication request;

data collection rules that are used to determine what authentication request data to scrape from the intercepted authentication request; and filter rules that filter the authentication request data to produce the filtered authentication data that is received by the central server;

wherein, for every transmission of filtered authentication data received by the central server from the first authenticating device, the central server responds to the first authenticating device after the first authenticating device determines, using blocking rules locally stored at the first authenticating device, whether to block an authentication request associated with a respective transmission from invoking the authentication API in the first authenticating device;

identifying malicious activity patterns of authentication activity spanning across a plurality of authenticating devices in a network environment;

determining updated blocking rules based on identified malicious activity patterns, wherein the updated blocking rules instruct the first authenticating device about which authentication requests to block from invoking the authentication application program interface (API); and sending the updated blocking rules to the first authenticating device.

* * * * *